(12) United States Patent
An et al.

(10) Patent No.: US 11,105,644 B2
(45) Date of Patent: Aug. 31, 2021

(54) SYSTEMS AND METHODS FOR IDENTIFYING CLOSED ROAD SECTION

(71) Applicant: BEIJING DIDI INFINITY TECHNOLOGY AND DEVELOPMENT CO., LTD., Beijing (CN)

(72) Inventors: Kaiqiang An, Beijing (CN); Guoping Liu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/094,828

(22) Filed: Nov. 11, 2020

(65) Prior Publication Data

US 2021/0063180 A1   Mar. 4, 2021

Related U.S. Application Data

(63) Continuation of application No. PCT/CN2019/091286, filed on Jun. 14, 2019.

(30) Foreign Application Priority Data

May 31, 2019   (CN) .......................... 201910469543.0

(51) Int. Cl.
  *G01C 21/34*  (2006.01)
  *G08G 1/01*  (2006.01)
  *G08G 1/065*  (2006.01)

(52) U.S. Cl.
  CPC ..... *G01C 21/3461* (2013.01); *G01C 21/3492* (2013.01); *G08G 1/0133* (2013.01); *G08G 1/065* (2013.01)

(58) Field of Classification Search
  CPC combination set(s) only.
  See application file for complete search history.

(56) References Cited

U.S. PATENT DOCUMENTS 5,982,298 A  *  11/1999  Lappenbusch ....... G08G 1/0969
                                                                   340/905
5,987,377 A  *  11/1999  Westerlage ............ G08G 1/202
                                                                   340/994

(Continued)

FOREIGN PATENT DOCUMENTS

CN     101882374 A     11/2010
CN     102243809 A     11/2011

(Continued)

OTHER PUBLICATIONS

International Search Report in PCT/CN2019/091286 dated Mar. 6, 2020, 5 pages.

(Continued)

*Primary Examiner* — Bhavesh V Amin
(74) *Attorney, Agent, or Firm* — Metis IP LLC

(57) ABSTRACT

The present disclosure relates to systems and methods for identifying a closed road section. The systems may obtain a first heat map representing a first density of tracked vehicles in a target area over a first time period and a second heat map representing a second density of tracked vehicles in the target area over a second time period; determine a difference map between the first heat map and the second heat map; determine one or more candidate regions based on the difference map; identify one or more candidate links associated with the one or more candidate regions in a road network map; determine one or more confidence levels associated with the one or more candidate links based on the one or more candidate regions; and identify one or more closed road sections based on the one or more confidence levels.

18 Claims, 10 Drawing Sheets

(56) References Cited

U.S. PATENT DOCUMENTS

| | | | | |
|---|---|---|---|---|
| 6,466,862 B1* | 10/2002 | DeKock | G08G 1/0104 | |
| | | | 340/901 | |
| 6,574,548 B2* | 6/2003 | DeKock | G08G 1/0104 | |
| | | | 340/901 | |
| 6,690,292 B1* | 2/2004 | Meadows | G08G 1/0104 | |
| | | | 340/905 | |
| 6,785,606 B2* | 8/2004 | DeKock | G08G 1/0104 | |
| | | | 375/E7.014 | |
| 6,804,524 B1* | 10/2004 | Vandermeijden | G01C 21/26 | |
| | | | 340/988 | |
| 7,409,286 B2* | 8/2008 | Ambort | G08G 1/08 | |
| | | | 104/88.02 | |
| 7,440,842 B1* | 10/2008 | Vorona | G08G 1/0104 | |
| | | | 340/995.12 | |
| 7,472,169 B2* | 12/2008 | Auxer | G06F 16/986 | |
| | | | 709/217 | |
| 7,536,254 B2* | 5/2009 | Kumagai | G08G 1/0104 | |
| | | | 340/934 | |
| 7,542,844 B2* | 6/2009 | Kumagai | G08G 1/0112 | |
| | | | 701/117 | |
| 7,555,381 B2* | 6/2009 | Kumagai | G01C 21/26 | |
| | | | 340/934 | |
| 7,580,788 B2* | 8/2009 | Hiruta | G08G 1/0104 | |
| | | | 340/934 | |
| 7,617,041 B2* | 11/2009 | Sera | G08G 1/01 | |
| | | | 701/119 | |
| 7,765,058 B2* | 7/2010 | Doering | B60R 16/0236 | |
| | | | 701/123 | |
| 7,899,612 B2* | 3/2011 | Kumagai | G08G 1/0104 | |
| | | | 701/117 | |
| 7,908,191 B1* | 3/2011 | Dinamani | G06Q 40/02 | |
| | | | 705/31 | |
| 7,912,627 B2* | 3/2011 | Downs | G08G 1/0133 | |
| | | | 701/117 | |
| 7,912,628 B2* | 3/2011 | Chapman | G08G 1/0141 | |
| | | | 701/117 | |
| 8,140,358 B1* | 3/2012 | Ling | G07C 5/008 | |
| | | | 705/4 | |
| 8,260,462 B2* | 9/2012 | Lin | A47L 9/00 | |
| | | | 700/258 | |
| 8,359,151 B2* | 1/2013 | Carruthers | G08G 1/096775 | |
| | | | 701/119 | |
| 8,694,241 B1* | 4/2014 | Kadous | G08G 1/0141 | |
| | | | 701/412 | |
| 9,070,296 B1* | 6/2015 | Kadous | G01S 19/14 | |
| 9,179,192 B1* | 11/2015 | Ning | G06F 16/29 | |
| 9,247,470 B2* | 1/2016 | Jain | H04L 67/00 | |
| 9,311,819 B1* | 4/2016 | Kadous | G08G 1/0141 | |
| 9,727,669 B1* | 8/2017 | Wilson | G01C 21/165 | |
| 10,657,409 B2* | 5/2020 | Piekniewski | G06K 9/4623 | |
| 10,706,605 B1* | 7/2020 | Russo | G06T 11/60 | |
| 10,832,449 B1* | 11/2020 | Russo | G06F 16/9537 | |
| 10,979,326 B2* | 4/2021 | Koo | H04W 24/04 | |
| 2004/0233070 A1* | 11/2004 | Finnern | G08G 1/096883 | |
| | | | 340/995.13 | |
| 2007/0233318 A1* | 10/2007 | Lei | G05D 1/0038 | |
| | | | 700/245 | |
| 2007/0299603 A1* | 12/2007 | Kirby | G01C 21/28 | |
| | | | 701/408 | |
| 2008/0039974 A1* | 2/2008 | Sandin | B60L 50/52 | |
| | | | 700/258 | |
| 2008/0109126 A1* | 5/2008 | Sandin | B60L 50/62 | |
| | | | 701/23 | |
| 2008/0121690 A1* | 5/2008 | Carani | G06Q 30/02 | |
| | | | 235/376 | |
| 2010/0228395 A1* | 9/2010 | Lin | A47L 9/00 | |
| | | | 700/258 | |
| 2012/0016872 A1* | 1/2012 | Khorashadi | G09B 29/006 | |
| | | | 707/724 | |
| 2013/0302758 A1* | 11/2013 | Wright | H04M 1/72454 | |
| | | | 434/65 | |
| 2014/0074895 A1* | 3/2014 | Ingerman | G01S 19/13 | |
| | | | 707/803 | |
| 2014/0303806 A1* | 10/2014 | Bai | G06Q 50/01 | |
| | | | 701/1 | |
| 2015/0012510 A1* | 1/2015 | van der Laan | G01C 21/32 | |
| | | | 707/702 | |
| 2015/0219467 A1* | 8/2015 | Ingerman | G01S 19/13 | |
| | | | 701/426 | |
| 2016/0012066 A1* | 1/2016 | Ning | H04N 21/4524 | |
| | | | 707/722 | |
| 2017/0061787 A1* | 3/2017 | Lorkowski | G01C 21/32 | |
| 2017/0167088 A1* | 6/2017 | Walker | G06Q 50/30 | |
| 2017/0236284 A1* | 8/2017 | Elliethy | G06T 7/33 | |
| | | | 382/294 | |
| 2017/0337305 A1* | 11/2017 | Wilson | G01C 21/20 | |
| 2018/0202816 A1* | 7/2018 | Kesting | G08G 1/0112 | |
| 2018/0252541 A1* | 9/2018 | Kesting | G01C 21/3415 | |
| 2018/0374364 A1* | 12/2018 | Kennedy | G06F 11/32 | |
| 2019/0122037 A1* | 4/2019 | Russell | G05D 1/0088 | |
| 2019/0213873 A1* | 7/2019 | Adireddy | G08G 1/164 | |
| 2019/0251386 A1* | 8/2019 | Piekniewski | G06T 3/00 | |
| 2019/0325389 A1* | 10/2019 | Dearing | G06F 16/29 | |
| 2020/0110416 A1* | 4/2020 | Hong | G06N 20/00 | |
| 2020/0127907 A1* | 4/2020 | Koo | H04L 43/06 | |
| 2020/0174481 A1* | 6/2020 | Van Heukelom | G05D 1/0088 | |
| 2020/0341466 A1* | 10/2020 | Pham | G01C 21/26 | |

FOREIGN PATENT DOCUMENTS

| | | |
|---|---|---|
| CN | 102298847 A | 12/2011 |
| CN | 104157139 A | 11/2014 |
| CN | 105139682 A | 12/2015 |
| CN | 105183769 A | 12/2015 |
| CN | 105809967 A | 7/2016 |
| CN | 106205126 A | 12/2016 |
| CN | 107346610 A | 11/2017 |
| CN | 108009188 A | 5/2018 |
| CN | 108648452 A | 10/2018 |
| CN | 109213949 A | 1/2019 |
| CN | 109345823 A | 2/2019 |
| CN | 109509346 A | 3/2019 |
| CN | 109598930 A | 4/2019 |
| JP | 2019021035 A | 2/2019 |

OTHER PUBLICATIONS

Written Opinion in PCT/CN2019/091286 dated Mar. 6, 2020, 4 pages.

Zhongyu Wang et al., Lane Changing Performance Study of Freeway Maintenance Work Zones Based on Vehicle Trajectory Data, Journal of Southeast University(Natural Science Edition), 4(48): 745-751, 2018.

Yongchuan Zhang et al., An Automatic Road Network Construction Method Using Massive GPS Trajectory Data, ISPRS International Journal of Geo-Information, 2017, 15 pages.

Shuilin Ren, Visual Analysis and System Development of Sparse Traffic Trajectory Data, China Excellent Master thesis Full-text Database Information Technology, 2018, 74 pages.

First Office Action in Chinese Application No. 201910469543.0 dated Apr. 28, 2020, 18 pages.

Notification to Grand in Chinese Application No. 201910469543.0 dated Oct. 22, 2020, 6 pages.

Ryan Prescott Adams et al., Bayesian Online Changepoint Detection, Web Page<https://arxiv.org/abs/0710.3742>, Oct. 19, 2007, 7 pages.

* cited by examiner

400

┌─────────────────────────────────────────────────┐
│ Obtaining a first heat map representing a first density of │
│ tracked vehicles in a target area over a first time period and │ ～402
│ a second heat map representing a second density of │
│ tracked vehicles in the target area over a second time │
│ period │
└─────────────────────────────────────────────────┘
                        ↓
┌─────────────────────────────────────────────────┐
│ Determining a difference map between the first heat map │ ～404
│ and the second heat map │
└─────────────────────────────────────────────────┘
                        ↓
┌─────────────────────────────────────────────────┐
│ Determining one or more candidate regions based on the │ ～406
│ difference map │
└─────────────────────────────────────────────────┘
                        ↓
┌─────────────────────────────────────────────────┐
│ Identifying one or more candidate links associated with the │ ～408
│ one or more candidate regions in a road network map │
└─────────────────────────────────────────────────┘
                        ↓
┌─────────────────────────────────────────────────┐
│ Determining one or more confidence levels associated with │ ～410
│ the one or more candidate links based on the one or more │
│ candidate regions │
└─────────────────────────────────────────────────┘
                        ↓
┌─────────────────────────────────────────────────┐
│ Identifying one or more closed road sections based on the │ ～412
│ one or more confidence levels │
└─────────────────────────────────────────────────┘

Obtaining flow information of at least one of the one or more candidate regions corresponding to a candidate link — 802

Determining a number count of intersections of the candidate link and at least one polygon corresponding to the at least one of the one or more candidate regions — 804

Determining the confidence level of the candidate link based on the flow information and the number count of intersections — 806

FIG. 8

SYSTEMS AND METHODS FOR IDENTIFYING CLOSED ROAD SECTION

CROSS-REFERENCE TO RELATED APPLICATIONS

This application is a continuation of International Patent Application No. PCT/CN2019/091286 filed on Jun. 14, 2019, which designates the United States of America and claims priority to Chinese Patent Application No. 201910469543.0 filed on May 31, 2019, the contents of which are incorporated herein by reference in their entirety.

TECHNICAL FIELD

The present disclosure generally relates to systems and methods for identifying closed road sections, and in particular, to systems and methods for identifying closed road sections based on heat maps associated with driving track points.

BACKGROUND

With rapid development of traffic environment, map services play an important role in modern society. When a road is closed for some reason (e.g., recondition, rebuild, extreme weather condition), a system for providing map services should identify the closed road and update maps timely and accurately. Generally, the system may obtain driving trajectory information, analyze the driving trajectory information based on a statistical approach or a supervised learning approach, and identify closed road(s) based on an analysis result. However, in some situations, it may be inefficient to identify closed road(s) based on the statistical approach or the supervised learning approach. Therefore, it is desirable to provide more efficient systems and methods for identifying closed road(s).

SUMMARY

An aspect of the present disclosure relates to a system for identifying a closed road section. The system may include a storage device to store a set of instructions and a processor communicatively coupled to the storage device. When executing the set of instructions, the processor may perform one or more of the following operations. The processor may obtain a first heat map representing a first density of tracked vehicles in a target area over a first time period and a second heat map representing a second density of tracked vehicles in the target area over a second time period. The processor may determine a difference map between the first heat map and the second heat map. The processor may determine one or more candidate regions based on the difference map. The processor may identify one or more candidate links associated with the one or more candidate regions in a road network map, each of the one or more candidate links linking to at least one of the one or more candidate regions. The processor may determine one or more confidence levels associated with the one or more candidate links based on the one or more candidate regions. The processor may further identify one or more closed road sections based on the one or more confidence levels.

In some embodiments, the processor may determine the first heat map and the second heat map based on a plurality of driving track points associated with a plurality of vehicles in the target area.

In some embodiments, the plurality of driving track points may be obtained based on positioning information associated with the plurality of vehicles.

In some embodiments, the processor may perform a first filtering operation on the first heat map to obtain a first processed heat map and a second filtering operation on the second heat map to obtain a second processed heat map. The processor may further determine the difference map by subtracting the second processed heat map from the first processed heat map.

In some embodiments, the processor may determine a binary map based on the difference map and determine the one or more candidate regions by performing a level set evolution based on the binary map.

In some embodiments, the processor may determine one or more polygons corresponding to the one or more candidate regions and join the one or more polygons in the road network map using an R-Tree algorithm. The processor may further identify the one or more candidate links associated with the one or more candidate regions based on a joining result.

In some embodiments, for each of the one or more candidate links, the processor may obtain flow information of the at least one of the one or more candidate regions corresponding to the candidate link. The processor may determine a number count of intersections of the candidate link and at least one polygon corresponding to the at least one of the one or more candidate regions. The processor may further determine the confidence level of the candidate link based on the flow information and the number count of intersections.

In some embodiments, the processor may select one or more target links from the one or more candidate links based on the one or more confidence levels. The processor may further identify the one or more closed road sections based on the one or more target links.

In some embodiments, the processor may select candidate links with confidence levels larger than a threshold as the one or more target links.

In some embodiments, the processor may rank the one or more candidate links based on the one or more confidence levels and select the one or more target links from the one or more candidate links based on a ranking result.

Another aspect of the present disclosure relates to a method for identifying a closed road section. The method may be implemented on a computing device having at least one processor, at least one storage medium, and a communication platform connected to a network. The method may include obtaining a first heat map representing a first density of tracked vehicles in a target area over a first time period and a second heat map representing a second density of tracked vehicles in the target area over a second time period. The method may also include determining a difference map between the first heat map and the second heat map. The method may also include determining one or more candidate regions based on the difference map. The method may also include identifying one or more candidate links associated with the one or more candidate regions in a road network map, each of the one or more candidate links linking to at least one of the one or more candidate regions. The method may also include determining one or more confidence levels associated with the one or more candidate links based on the one or more candidate regions. The method may further include identifying one or more closed road sections based on the one or more confidence levels.

In some embodiments, the first heat map and the second heat map may be determined based on a plurality of driving track points associated with a plurality of vehicles in the target area.

In some embodiments, the plurality of driving track points may be obtained based on positioning information associated with the plurality of vehicles.

In some embodiments, the obtaining a first heat map representing a first density of tracked vehicles in a target area over a first time period and a second heat map representing a second density of tracked vehicles in the target area over a second time period may include performing a first filtering operation on the first heat map to obtain a first processed heat map and a second filtering operation on the second heat map to obtain a second processed heat map; and determining the difference map by subtracting the second processed heat map from the first processed heat map.

In some embodiments, the determining one or more candidate regions based on the difference map may include determining a binary map based on the difference map; and determining the one or more candidate regions by performing a level set evolution based on the binary map.

In some embodiments, the identifying one or more candidate links associated with the one or more candidate regions in a road network map may include determining one or more polygons corresponding to the one or more candidate regions; joining the one or more polygons in the road network map using an R-Tree algorithm; and identifying the one or more candidate links associated with the one or more candidate regions based on a joining result.

In some embodiments, the determining one or more confidence levels associated with the one or more candidate links based on the one or more candidate regions may include for each of the one or more candidate links, obtaining flow information of the at least one of the one or more candidate regions corresponding to the candidate link; determining a number count of intersections of the candidate link and at least one polygon corresponding to the at least one of the one or more candidate regions; and determining the confidence level of the candidate link based on the flow information and the number count of intersections.

In some embodiments, the identifying one or more closed road sections based on the one or more confidence levels may include selecting, based on the one or more confidence levels, one or more target links from the one or more candidate links; and identifying the one or more closed road sections based on the one or more target links.

In some embodiments, the selecting, based on the one or more confidence levels, one or more target links from the one or more candidate links may include selecting candidate links with confidence levels larger than a threshold as the one or more target links.

In some embodiments, the selecting, based on the one or more confidence levels, one or more target links from the one or more candidate links may include ranking the one or more candidate links based on the one or more confidence levels; and selecting the one or more target links from the one or more candidate links based on a ranking result.

Yet another aspect of the present disclosure relates to a system for identifying a closed road section. The system may include an obtaining module, a difference map determination module, a candidate region determination module, a candidate link identification module, a confidence level determination module, and a closed road section identification module. The obtaining module may be configured to obtain a first heat map representing a first density of tracked vehicles in a target area over a first time period and a second heat map representing a second density of tracked vehicles in the target area over a second time period. The difference map determination module may be configured to determine a difference map between the first heat map and the second heat map. The candidate region determination module may be configured to determine one or more candidate regions based on the difference map. The candidate link identification module may be configured to identify one or more candidate links associated with the one or more candidate regions in a road network map, each of the one or more candidate links linking to at least one of the one or more candidate regions. The confidence level determination module may be configured to determine one or more confidence levels associated with the one or more candidate links based on the one or more candidate regions. The closed road section identification module may be configured to identify one or more closed road sections based on the one or more confidence levels.

In some embodiments, the obtaining module may determine the first heat map and the second heat map based on a plurality of driving track points associated with a plurality of vehicles in the target area.

In some embodiments, the plurality of driving track points may be obtained based on positioning information associated with the plurality of vehicles.

In some embodiments, the difference map determination module may perform a first filtering operation on the first heat map to obtain a first processed heat map and a second filtering operation on the second heat map to obtain a second processed heat map. The difference map determination module may further determine the difference map by subtracting the second processed heat map from the first processed heat map.

In some embodiments, the candidate region determination module may determine a binary map based on the difference map and determine the one or more candidate regions by performing a level set evolution based on the binary map.

In some embodiments, the candidate link identification module may determine one or more polygons corresponding to the one or more candidate regions and join the one or more polygons in the road network map using an R-Tree algorithm. The candidate link identification module may further identify the one or more candidate links associated with the one or more candidate regions based on a joining result.

In some embodiments, for each of the one or more candidate links, the confidence level determination module may obtain flow information of the at least one of the one or more candidate regions corresponding to the candidate link. The confidence level determination module may determine a number count of intersections of the candidate link and at least one polygon corresponding to the at least one of the one or more candidate regions. The confidence level determination module may further determine the confidence level of the candidate link based on the flow information and the number count of intersections.

In some embodiments, the closed road section identification module may select one or more target links from the one or more candidate links based on the one or more confidence levels. The closed road section identification module may further identify the one or more closed road sections based on the one or more target links.

In some embodiments, the closed road section identification module may select candidate links with confidence levels larger than a threshold as the one or more target links.

In some embodiments, the closed road section identification module may rank the one or more candidate links based on the one or more confidence levels and select the one or more target links from the one or more candidate links based on a ranking result.

Yet another aspect of the present disclosure relates to a non-transitory computer readable medium. The non-transitory computer readable medium may include a set of instructions for identifying a closed road section. When executed by at least one processor, the set of instructions may direct the at least one processor to effectuate a method. The method may include obtaining a first heat map representing a first density of tracked vehicles in a target area over a first time period and a second heat map representing a second density of tracked vehicles in the target area over a second time period. The method may also include determining a difference map between the first heat map and the second heat map. The method may also include determining one or more candidate regions based on the difference map. The method may also include identifying one or more candidate links associated with the one or more candidate regions in a road network map, each of the one or more candidate links linking to at least one of the one or more candidate regions. The method may also include determining one or more confidence levels associated with the one or more candidate links based on the one or more candidate regions. The method may further include identifying one or more closed road sections based on the one or more confidence levels.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5-B is a schematic diagram illustrating an exemplary process for determining one or more candidate regions based on a difference map according to some embodiments of the present disclosure;

FIG. 8 is a flowchart illustrating an exemplary process for determining a confidence level of a candidate link according to some embodiments of the present disclosure.

DETAILED DESCRIPTION

Figure 1:
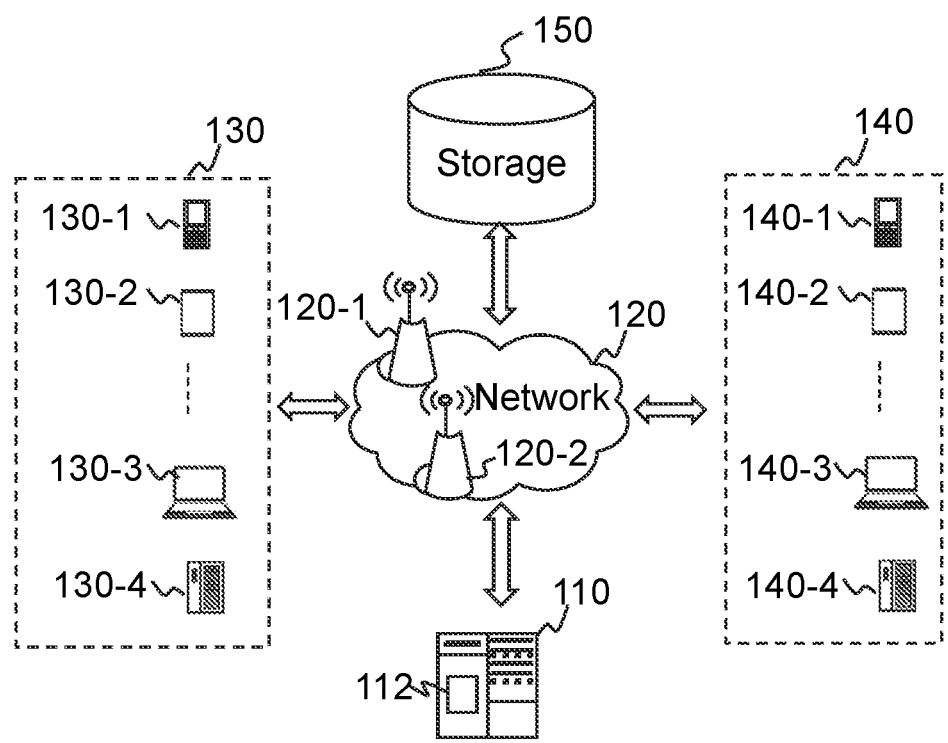
FIG. 1 is a schematic diagram illustrating an exemplary road identification system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure, and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order or simultaneously. Moreover, one or more other operations may be added to the flowcharts. One or more operations may be removed from the flowcharts.

Moreover, while the systems and methods disclosed in the present disclosure are described primarily regarding on-demand transportation services, it should also be understood that this is only one exemplary embodiment. The systems and methods of the present disclosure may be applied to any other kind of on-demand service. For example, the systems and methods of the present disclosure may be applied to different transportation systems including land, ocean, aerospace, or the like, or any combination thereof. The vehicle of the transportation systems may include a taxi, a private car, a hitch, a bus, a driverless vehicle, or the like, or any combination thereof. The transportation system may also include any transportation system that applies management and/or distribution, for example, a system for transmitting and/or receiving an express. The application scenarios of the systems and methods of the present disclosure may include a web page, a plug-in of a browser, a client terminal, a custom system, an internal analysis system, an artificial intelligence robot, or the like, or any combination thereof.

The terms "passenger," "requester," "requestor," "service requester," "service requestor," and "customer" in the present disclosure are used interchangeably to refer to an individual, an entity, or a tool that may request or order a service. Also, the terms "driver," "provider," "service provider," and "supplier" in the present disclosure are used interchangeably to refer to an individual, an entity, or a tool that may provide a service or facilitate the providing of the service. The term "user" in the present disclosure refers to an individual, an entity, or a tool that may request a service, order a service, provide a service, or facilitate the providing of the service. In the present disclosure, terms "requester" and "requester terminal" may be used interchangeably, and terms "provider" and "provider terminal" may be used interchangeably.

The terms "request," "service," "service request," and "order" in the present disclosure are used interchangeably to refer to a request that may be initiated by a passenger, a requester, a service requester, a customer, a driver, a provider, a service provider, a supplier, or the like, or a combination thereof. The service request may be accepted by any one of a passenger, a requester, a service requester, a customer, a driver, a provider, a service provider, or a supplier. The service request may be chargeable or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a Beidou navigation satellite system, a wireless fidelity (WiFi) positioning technology, or the like, or any combination thereof. One or more of the above positioning technologies may be used interchangeably in the present disclosure. For example, the GPS-based method and the WiFi-based method may be used together as positioning technologies to locate the wireless device.

An aspect of the present disclosure relates to systems and methods for identifying closed road sections. The systems may obtain a first heat map representing a first density of tracked vehicles in a target area (e.g., a city) over a first time period (e.g., a day) and a second heat map representing a second density of tracked vehicles in the target area over a second time period (e.g., a next day). The systems may determine a difference map between the first heat map and the second heat map. The systems may determine one or more candidate regions based on the difference map. The systems may identify one or more candidate links associated with the one or more candidate regions in a road network map, each of the one or more candidate links linking to at least one of the one or more candidate regions. The systems may also determine one or more confidence levels associated with the one or more candidate links based on the one or more candidate regions. Further, the systems may identify one or more closed road sections based on the one or more confidence levels. According to the systems and methods of the present disclosure, closed road sections can be identified based on heat maps which are determined based on driving track points associated with tracked vehicles, thereby improving the efficiency and accuracy of the road identification.

It should be noted that GPS positioning, overall, is a technology deeply rooted in Internet world. Identifying one or more closed road sections based on position information associated with vehicles is not possible without the possibility of communication between terminal devices and a remote server. Therefore, the technical solution disclosed in the present disclosure is also a technology deeply rooted in Internet era.

FIG. 1 is a schematic diagram illustrating an exemplary road identification system according to some embodiments of the present disclosure. The road identification system may identify closed road sections based on driving track information associated with vehicles. The road identification system may be applied in various application scenarios, such as an on-demand transportation service scenario, a navigation service scenario, a map service scenario, etc. For illustration purposes, the present disclosure takes an on-demand transportation service scenario as an example, accordingly the road identification system 100 may be an online transportation service platform for transportation services such as taxi hailing services, chauffeur services, express car services, carpool services, bus services, etc. In some embodiments, the road identification system 100 may include a server 110, a network 120, a requestor terminal 130, a provider terminal 140, and a storage 150.

The server 110 may be a single server or a server group. The server group may be centralized or distributed (e.g., server 110 may be a distributed system). In some embodiments, the server 110 may be local or remote. For example, the server 110 may access information and/or data stored in the requestor terminal 130, the provider terminal 140, and/or the storage 150 via the network 120. As another example, the server 110 may connect to the requestor terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data to perform one or more functions described in the present disclosure. For example, the processing engine 112 may obtain position information (e.g., GPS information) associated with a plurality of vehicles from a plurality of provider terminals 140 and generate a heat map associated with a plurality of driving track points based on the position information. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components (e.g., the server 110, the requestor terminal 130, the provider terminal 140, and the storage 150) of the road identification system 100 may transmit information and/or data to other component(s) of the road identification system 100 via the network 120. For example, the server 110 may receive GPS information from the provider terminal 140 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the road identification system 100 may be connected to the network 120 to exchange data and/or information between them.

In some embodiments, a requestor may be a user of the requestor terminal 130. In some embodiments, the user of the requestor terminal 130 may be someone other than the requestor. For example, a user A of the requestor terminal 130 may use the requestor terminal 130 to transmit a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may use the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be similar to, or the same device as the requestor terminal 130. In some embodiments, the provider terminal 140 may be a device with positioning technology for locating the position of the provider and/or the provider terminal 140. In some embodiments, the provider terminal 140 may periodically transmit GPS information to the server 110. In some embodiments, the requestor terminal 130 and/or the provider terminal 140 may communicate with another positioning device to determine the position of the requestor, the requestor terminal 130, the provider, and/or the provider terminal 140. In some embodiments, the requestor terminal 130 and/or the provider terminal 140 may transmit positioning information to the server 110.

The storage 150 may store data and/or instructions. In some embodiments, the storage 150 may store data obtained from the requestor terminal 130 and/or the provider terminal 140. In some embodiments, the storage 150 may store data and/or instructions that the server 110 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components (e.g., the server 110, the requestor terminal 130, the provider terminal 140) of the road identification system 100. One or more components of the road identification system 100 may access the data or instructions stored in the storage 150 via the network 120. In some embodiments, the storage 150 may be directly connected to or communicate with one or more components (e.g., the server 110, the requestor terminal 130, the provider terminal 140) of the road identification system 100. In some embodiments, the storage 150 may be part of the server 110.

In some embodiments, one or more components (e.g., the server 110, the requestor terminal 130, the provider terminal 140) of the road identification system 100 may access the storage 150. In some embodiments, one or more components of the road identification system 100 may read and/or modify information relating to the requester, the provider, and/or the public when one or more conditions are met. For example, the server 110 may read and/or modify one or more users' information after a service is completed. As another example, the provider terminal 140 may access information relating to the requestor when receiving a service request from the requestor terminal 130, but the provider terminal 140 can not modify the relevant information of the requestor.

In some embodiments, information exchanging of one or more components of the road identification system 100 may be achieved by way of requesting a service. The object of the service request may be any product. In some embodiments, the product may be a tangible product or immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), or the like, or any combination thereof.

One of ordinary skill in the art would understand that when an element of the road identification system 100 performs, the element may perform through electrical signals and/or electromagnetic signals. For example, when a requestor terminal 130 processes a task, such as making a determination, identifying or selecting an object, the requestor terminal 130 may operate logic circuits in its processor to process such task. When the requestor terminal 130 sends out a service request to the server 110, a processor of the service requestor terminal 130 may generate electrical signals encoding the service request. The processor of the requestor terminal 130 may then send the electrical signals to an output port. If the requestor terminal 130 communicates with the server 110 via a wired network, the output port may be physically connected to a cable, which may further transmit the electrical signals to an input port of the server 110. If the requestor terminal 130 communicates with the server 110 via a wireless network, the output port of the requestor terminal 130 may be one or more antennas, which may convert the electrical signals to electromagnetic signals.

Similarly, a provider terminal 140 may process a task through operation of logic circuits in its processor, and receive an instruction and/or service request from the server 110 via electrical signals or electromagnet signals. Within an electronic device, such as the requestor terminal 130, the provider terminal 140, and/or the server 110, when a processor thereof processes an instruction, sends out an instruction, and/or performs an action, the instruction and/or action is conducted via electrical signals. For example, when the processor retrieves or saves data from a storage medium (e.g., the storage 150), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

It should be noted that the application scenario illustrated in FIG. 1 is only provided for illustration purposes, and not intended to limit the scope of the present disclosure. For example, the road identification system 100 may be used as a navigation system. The navigation system may include a user terminal (e.g., the provider terminal 140) and a server (e.g., the server 110). When a user intends to drive a vehicle to a destination, the navigation system may provide a navigation service for the user and during the navigation service, the navigation system may periodically obtain GPS information of the vehicle from a GPS device integrated in the user terminal. The navigation system may obtain GPS information associated with a plurality of vehicles within a predetermined time period (e.g., 1 month) in a region (e.g., a city) and identify one or more closed road sections based on the GPS information according to the process and/or method described in this disclosure.

Figure 2:
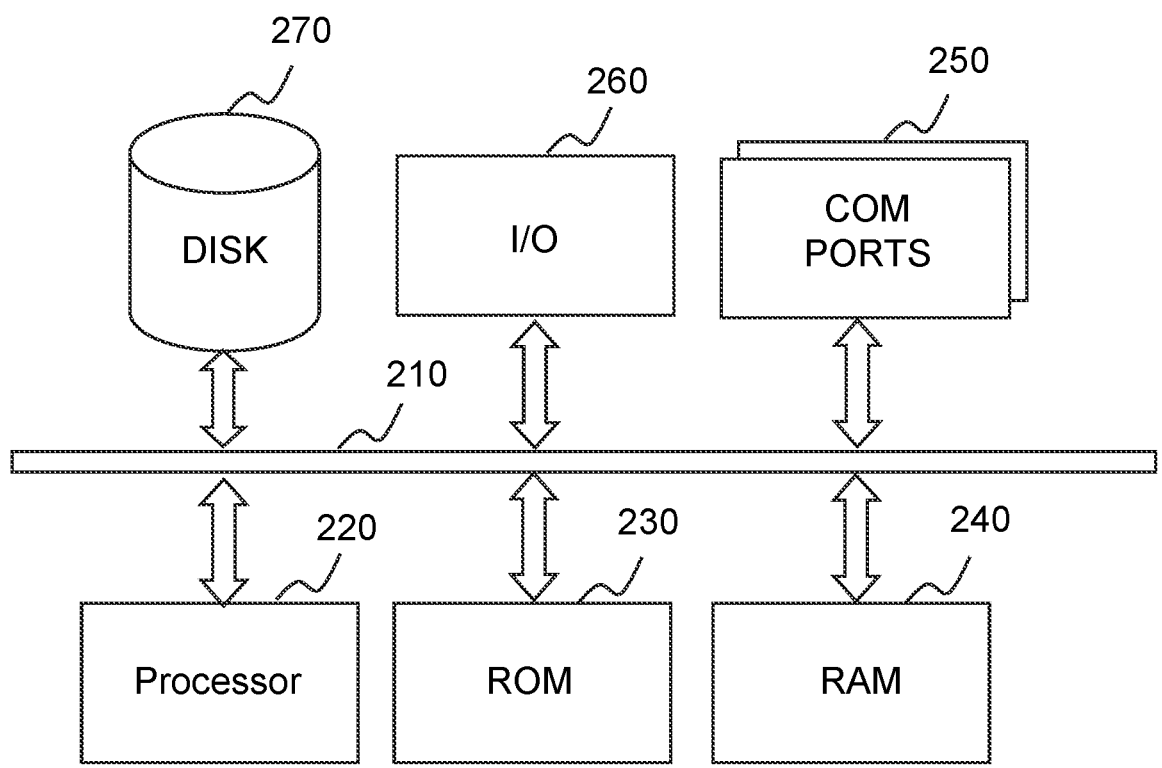
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110, the requestor terminal 130, and/or the provider terminal 140 may be implemented on the computing device 200. For example, the processing engine 112 may be implemented on the computing device 200 and configured to perform functions of the processing engine 112 disclosed in this disclosure.

The computing device 200 may be used to implement any component of the road identification system 100 as described herein. For example, the processing engine 112 may be implemented on the computing device 200, via its hardware, software program, firmware, or a combination thereof. Although only one such computer is shown, for convenience, the computer functions described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may also include program storage and data storage of different forms including, for example, a disk 270, a read only memory (ROM) 230, or a random access memory (RAM) 240, for storing various data files to be processed and/or transmitted by the computing device 200. The computing device 200 may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
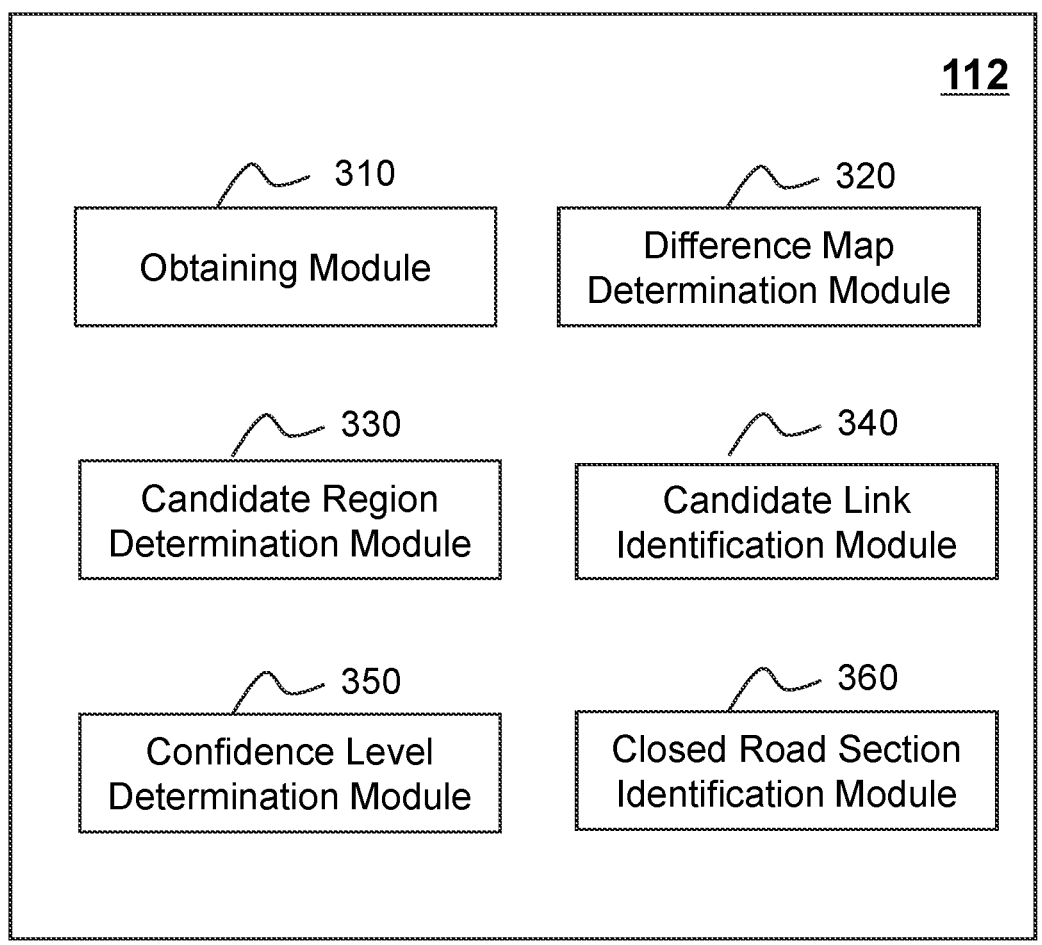
FIG. 3 is a block diagram illustrating an exemplary processing engine according to some embodiments of the present disclosure.

FIG. 3 is a block diagram illustrating an exemplary processing engine according to some embodiments of the present disclosure. In some embodiments, the processing engine 112 may include an obtaining module 310, a difference map determination module 320, a candidate region determination module 330, a candidate link identification module 340, a confidence level determination module 350, and a closed road section identification module 360.

The obtaining module 310 may be configured to obtain a first heat map representing a first density of tracked vehicles in a target area over a first time period and a second heat map representing a second density of tracked vehicles in the target area over a second time period. In some embodiments, the target area may be a city, a district, a predetermined geographic region with a certain radius (e.g., 500 m, 1 km, 5 km, 10 km) from a predetermined center location, etc.

The difference map determination module 320 may be configured to determine a difference map between the first heat map and the second heat map. The difference map may indicate a difference between the first density of tracked vehicles over the first time period and the second density of tracked vehicles over the second time period.

The candidate region determination module 330 may be configured to determine one or more candidate regions based on the difference map. In some embodiments, the candidate region determination module 330 may determine a binary map based on the difference map and determine the one or more candidate regions based on the binary map. More descriptions regarding the determination of the one or more candidate regions may be found elsewhere in the present disclosure, for example, FIG. 5-B and the description thereof.

The candidate link identification module 340 may be configured to identify one or more candidate links associated with the one or more candidate regions in a road network map, wherein each of the one or more candidate links corresponds to (also referred to as "links to") at least one of the one or more candidate regions. In some embodiments, the candidate link identification module 340 may determine one or more polygons corresponding to the one or more candidate regions and join the one or more polygons in the road network map. Further, the candidate link identification module 340 may further identify the one or more candidate links associated with one or more candidate regions based on a joining result. More descriptions regarding the identification of the one or more candidate links may be found elsewhere in the present disclosure, for example, FIG. 6 and the description thereof.

The confidence level determination module 350 may be configured to determine one or more confidence levels associated with the one or more candidate links based on the one or more candidate regions. As used herein, the confidence level may be a value within a range from 0 to 1, which indicates a probability that a corresponding candidate link corresponds to a closed road section.

The closed road section identification module 360 may be configured to identify one or more closed road sections based on the one or more confidence levels. In some embodiments, the closed road section identification module 360 may select one or more target links from the one or more candidate links based on the one or more confidence levels and identify the one or more closed road sections based on the one or more target links.

The modules in the processing engine 112 may be connected to or communicate with each other via a wired connection or a wireless connection. The wired connection may include a metal cable, an optical cable, a hybrid cable, or the like, or a combination thereof. The wireless connection may include a Local Area Network (LAN), a Wide Area Network (WAN), a Bluetooth, a ZigBee, a Near Field Communication (NFC), or the like, or a combination thereof. Two or more of the modules may be combined into a single module, and any one of the modules may be divided into two or more units. For example, the difference map determination module 320 and the candidate region determination module 330 may be combined as a single module which may both determine a difference map between the first heat map and the second heat map and determine one or more candidate regions based on the difference map. As another example, the processing engine 112 may include a storage module (not shown in FIG. 3) which may be configured to store the first heat map, the second heat map, the difference map, the one or more candidate regions, the one or more candidate links, the one or more confidence levels, etc.

Figure 4:
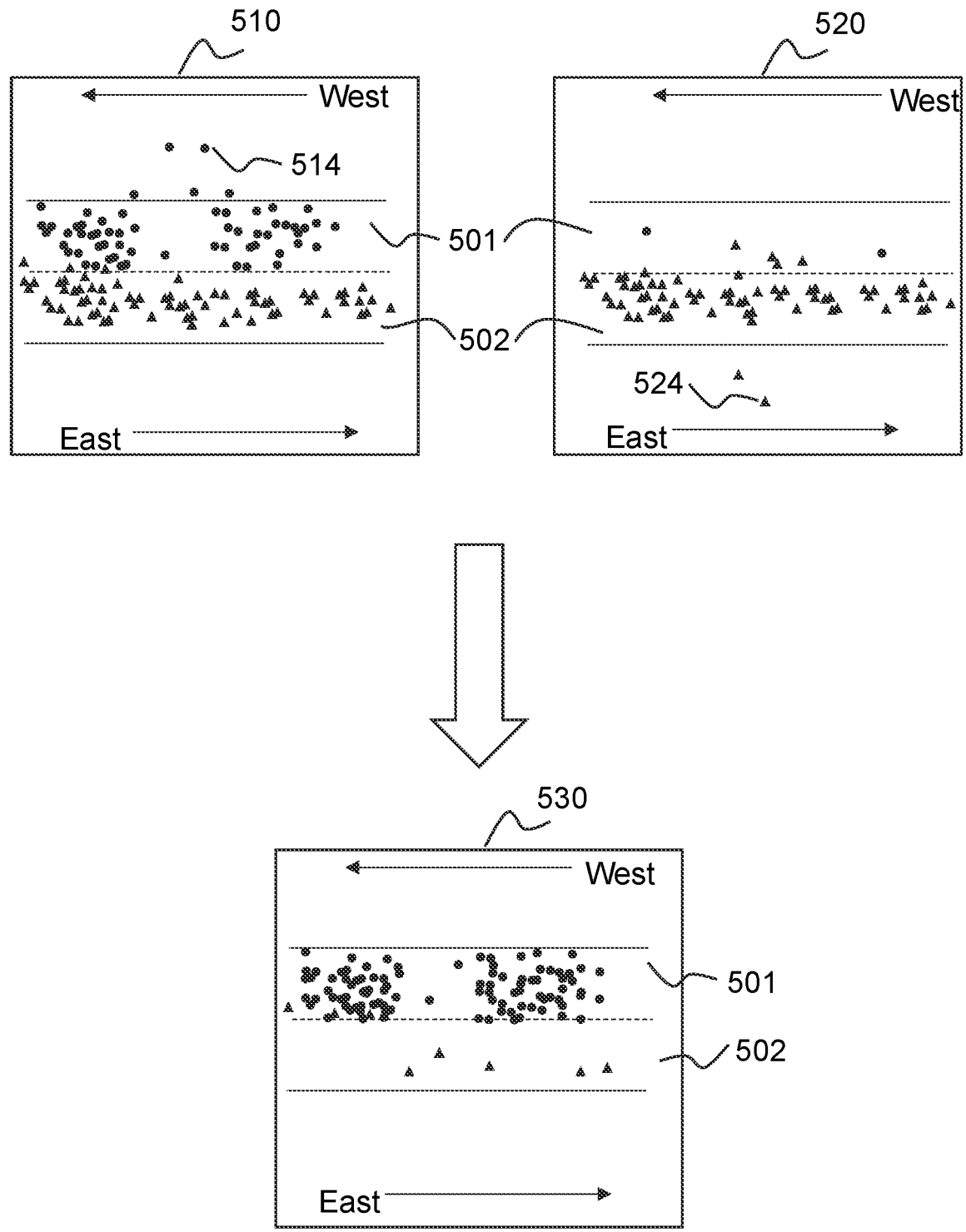
FIG. 4 is a flowchart illustrating an exemplary process for identifying one or more closed road sections according to some embodiments of the present disclosure.

FIG. 4 is a flowchart illustrating an exemplary process for identifying one or more closed road sections according to some embodiments of the present disclosure. The process 400 may be executed by the road identification system 100. For example, the process 400 may be implemented as a set of instructions (e.g., an application) stored in the storage ROM 230 or RAM 240. The processor 220 and/or the modules in FIG. 3 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described and/or without one or more of the operations discussed. Additionally, the order in which the operations of the process as illustrated in FIG. 4 and described below is not intended to be limiting.

In 402, the processing engine 112 (e.g., the obtaining module 310) (e.g., the interface circuits or the processing circuits of the processor 220) may obtain a first heat map representing a first density of tracked vehicles in a target area over a first time period and a second heat map representing a second density of tracked vehicles in the target area over a second time period. In some embodiments, the target area may be a city, a district, a predetermined geographic region with a certain radius (e.g., 500 m, 1 km, 5 km, 10 km) from a predetermined center location, etc.

As used herein, a heat map may be a graphical image (e.g., a red green blue (RGB) image, a grayscale image) including background information (e.g., buildings, road sections) and a plurality of driving track points associated with a plurality of vehicles in the target area. For example, the processing engine 112 may add the plurality of driving track points on a map (e.g., a Google Map, a Baidu Map) to obtain the heat map. The plurality of driving track points may be obtained based on position information (e.g., GPS information) associated with a plurality of vehicles (also referred to as "tracked vehicles") within a time period (e.g., an hour, a day, a week, a month). The processing engine 112 may obtain the position information associated with the plurality of vehicles from a plurality of provider terminals 140, a plurality of positioning devices integrated in the plurality of vehicles, or a storage device (e.g., the storage 150) disclosed elsewhere in the present disclosure.

In some embodiments, as described above, the heat map may represent a density of tracked vehicles in the target area over the time period. Take a specific region in the target area as an example, the more the driving track points in the region are, the more tracked vehicles passing through the region over the time period may be (i.e., the larger the density of the tracked vehicles may be), and the deeper the color of the region in the heat map may be.

In some embodiments, the second time period may be a time period after the first time period, and the first time period and the second time period may correspond to a same time segment in a time cycle (e.g., a day, a week, a month). For example, the first time period may be a day and the second time period may be a next day or any subsequent day. As another example, the first time period may be 7:00 a.m.~9:00 a.m. on a working day (e.g., Monday) and the second time period may be 7:00 a.m.~9:00 a.m. on a next working day (e.g., Tuesday) or any subsequent working day (e.g., Thursday, Friday). As another example, the first time period may be a weekend (e.g., Sunday) and the second time period may be a next weekend or any subsequent weekend. In some embodiments, the second time period may be any time period after the first time period. For example, the first time period may 10:00 a.m.~11:00 a.m. and the second time period may be 11:00 a.m. 12:00 a.m.

In 404, the processing engine 112 (e.g., the difference map determination module 320) (e.g., the processing circuits of the processor 220) may determine a difference map between the first heat map and the second heat map. The difference map may indicate a difference between the first density of tracked vehicles over the first time period and the second density of tracked vehicles over the second time period.

In some embodiments, there may be shifts in the position information (e.g., the GPS information) associated with the plurality of vehicles, which may result in that some of the plurality of driving track points may deviate from actual positions (these points are considered as noises). Therefore, the processing engine 112 may perform a first filtering operation on the first heat map to obtain a first processed heat map and a second filtering operation on the second heat map to obtain a second processed heat map. The processing engine 112 may further determine the difference map by subtracting the second processed heat map from the first processed heat map.

In 406, the processing engine 112 (e.g., the candidate region determination module 330) (e.g., the processing circuits of the processor 220) may determine one or more candidate regions based on the difference map. As used herein, a candidate region may be a region with a density of tracked vehicles larger than that of surrounding regions in the difference map.

In some embodiments, the processing engine 112 may determine a binary map based on the difference map and determine the one or more candidate regions based on the binary map. As used herein, the binary map refers to a map in which a pixel value of each pixel is 0 (which represents white) or 255 (which represents black). Specifically, the processing engine 112 may determine the binary map based on a pixel value threshold. For each of pixels in the difference map, in response to determining that a pixel value of the pixel is larger than the pixel value threshold, the processing engine 112 may determine a new pixel value "255" for the pixel; whereas, in response to determining that the pixel value of the pixel is lower than or equal to the pixel value threshold, the processing engine 112 may determine a new pixel value "0" for the pixel. Further, the processing engine 112 may determine the binary map based on the new pixel values of the pixels.

After determining the binary map, the processing engine 112 may further determine the one or more candidate regions by performing a level set evolution based on the binary map. More descriptions regarding the determination of the one or more candidate regions may be found elsewhere in the present disclosure, for example, FIG. 5-B and the description thereof.

In 408, the processing engine 112 (e.g., the candidate link identification module 340) (e.g., the processing circuits of the processor 220) may identify one or more candidate links associated with the one or more candidate regions in a road network map, wherein each of the one or more candidate links corresponds to (also referred to as "links to") at least one of the one or more candidate regions. As used herein, the term "link" refers to a line in the road network map, which corresponds to a road section.

In some embodiments, the processing engine 112 may determine one or more polygons corresponding to the one or more candidate regions and join the one or more polygons in the road network map. Further, the processing engine 112 may further identify the one or more candidate links associated with one or more candidate regions based on a joining result. More descriptions regarding the identification of the one or more candidate links may be found elsewhere in the present disclosure, for example, FIG. 6 and the description thereof.

In 410, the processing engine 112 (e.g., the confidence level determination module 350) (e.g., the processing circuits of the processor 220) may determine one or more confidence levels associated with the one or more candidate links based on the one or more candidate regions. As used herein, the confidence level may be a value within a range from 0 to 1, which indicates a probability that a corresponding candidate link corresponds to a closed road section.

In some embodiments, for each candidate link, the processing engine 112 may obtain flow information (e.g., a number count of driving track points) of at least one of the one or more candidate regions corresponding to the candidate link. The processing engine 112 may determine a number count of intersections of the candidate link and at least one polygon corresponding to the at least one of the one or more candidate regions. Further, the processing engine 112 may determine the confidence level of the candidate link based on the flow information and the number count of intersections. More descriptions regarding the determination of the one or more confidence levels may be found elsewhere in the present disclosure, for example, FIG. 8 and the descriptions thereof.

In 412, the processing engine 112 (e.g., the closed road section determination module 360) (e.g., the processing circuits of the processor 220) may identify one or more closed road sections based on the one or more confidence levels.

In some embodiments, the processing engine 112 may select one or more target links from the one or more candidate links based on the one or more confidence levels. For example, the processing engine 112 may determine a level threshold (e.g., 0.9, 0.8, 0.7) and select candidate link(s) with confidence level(s) larger than the level threshold as the target link(s). The level threshold may be a default setting of the road identification system 100 or may be adjustable under different situations. As another example, the processing engine 112 may rank the one more candidate links based on the one or more confidence levels (e.g., from large to small) and select at least one (e.g., top 1, top 2, top 5) of the ranked one or more candidate links as the target link(s).

After determining the one or more target links, the processing engine 112 may identify the one or more closed road sections based on the one or more target links. As described above, a link corresponds to a road section. The processing engine 112 may identify road section(s) corresponding to the one or more target links as the closed road section(s). Further, when planning recommended routes for transportation service requests or providing navigation services, the processing engine 112 may consider the identified closed road section(s) and make some adjustments accordingly (if necessary).

In some embodiments, since actual roads generally along four directions (including "from north to south," "from south to north," "from east to west," and "from west to east"), the processing engine 112 may perform process 400 along the four directions respectively and determine a final identification result by merging four intermediate identification results.

In some embodiments, since densities of vehicles in some special road sections may change periodically due to natural causes instead of road closure, the processing engine 112 may identify and mark the situation, and before performing process 400, the processing engine 112 may determine whether the target area includes the special road section(s). In response to determining that the target area includes the special road section(s), the processing engine 112 may pre-filter out the special road section(s).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more optional operations (e.g., a storing operation) may be added elsewhere in the process 400. In the storing operation, the processing engine 112 may store the first heat map, the second heat map, the difference map, the one or more candidate regions, the one or more candidate links, the one or more confidence levels, etc.

Figure 5:
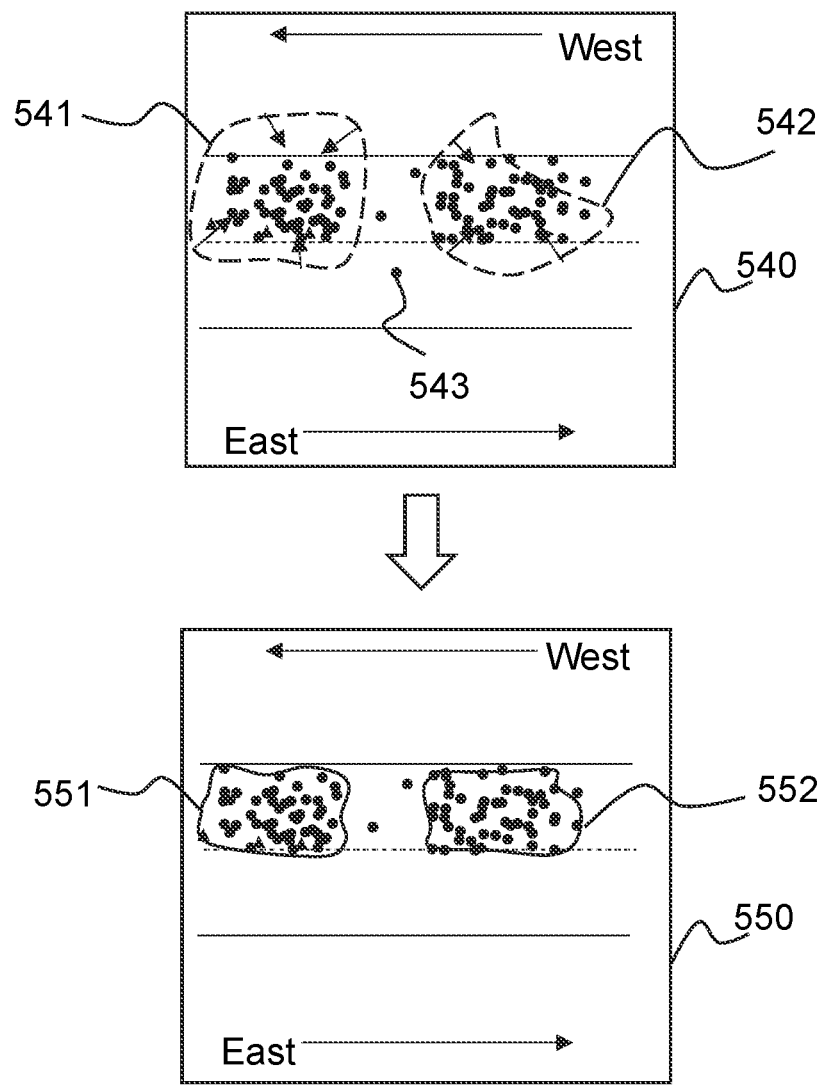
FIG. 5-A is a schematic diagram illustrating an exemplary process for determining a difference map between the first heat map and the second heat map according to some embodiments of the present disclosure.

FIG. 5-A is a schematic diagram illustrating an exemplary process for determining a difference map between the first heat map and the second heat map according to some embodiments of the present disclosure. As illustrated, 510 refers to the first heat map, 520 refers to the second heat map, and 530 refers to the difference map. For convenience, only parts of the three maps are shown.

As illustrated, solid dots refer to driving track points along a section of a first lane 501 and filled triangles refer to driving track points along a section of a second lane 502. It can be seen that some driving track points (e.g., 514, 524) are located outside the road (i.e., drifts occurred). In order to reduce the effect of drifts (which may result in noises), as described in connection with operation 404, the processing engine 112 may perform a first filtering operation on the first heat map to obtain a first processed heat map and a second filtering operation on the second heat map to obtain a second processed heat map. Further, the processing engine 112 may determine the difference map 530 by subtracting the second processed heat map from the first processed heat map.

Moreover, it can be seen that an amount of the driving track points along the section of the first lane 501 in the second heat map 520 is very low and significantly less than an amount of the driving track points along the section of the first lane 501 in the first heat map 510, which indicates that the section of the first lane 501 may corresponds to a closed road section over the second time period (in ideal conditions, the amount of the driving track points along the section of the first lane 501 in the second heat map 520 should be zero). On the other hand, an amount of the driving track points along the section of the second lane 502 in the second heat map 520 is almost equal to an amount of the driving track points along the section of the second lane 502 in the first heat map 510 (in the present disclosure, we assume that a density of tracked vehicles along a specific road section is approximately stable). In conclusion, it can be seen that in the difference map 530, almost all driving track points are located on the section of the first lane 501, which may be further used to determine the one or more candidate regions as described in FIG. 5-B and the description thereof.

FIG. 5-B is a schematic diagram illustrating an exemplary process for determining one or more candidate regions based on a difference map according to some embodiments of the present disclosure.

As described in connection with FIG. 5-A and operation 406, the processing engine 112 may determine a binary map (e.g., 540 illustrated in FIG. 5-B) based on the difference map (e.g., 530 illustrated in FIG. 5-A). In order to determine the one or more candidate regions, the processing engine 112 may perform a level set evolution based on the binary map. For example, as illustrated in FIG. 5-B, the processing engine 112 may determine an initial boundary 541 and an initial boundary 542 based on the binary map 540. A shape of the initial boundary 541 and/or a shape of the initial boundary 542 may include a circle, a rectangle, a triangle, an irregular shape, etc. According to the level set evolution, take the initial boundary 541 as an example, each pixel on the initial boundary 541 may correspond to an evolution speed and an evolution direction (e.g., a normal direction of the initial boundary 541). The evolution speed may be a default setting of the road identification system 100 or may be adjustable under different situations. For example, the larger the gradient of the pixel is, the lower the evolution speed may be. Further, the processing engine 112 may iteratively modify the initial boundary 541 until a gradient of each pixel on a modified boundary is larger than a gradient threshold. Accordingly, the processing engine 112 may determine a candidate region 551 based on the modified boundary. Similarly, the processing engine 112 may also determine a candidate region 552 based on a modified boundary corresponding to the initial boundary 542.

In some embodiments, after determining the initial boundary based on the binary map, the processing engine 112 may perform a level set evolution based on the initial boundary in the difference map and determine the one or more candidate regions in the difference map.

In some embodiments, the processing engine 112 may further perform a filtering operation on the binary map to eliminate driving tracking points (e.g., 543) located outside of the candidate regions, to reduce the effect of noises.

As described in connection with operation 408, after determining the one or more candidate regions, the processing engine 112 may determine one or more polygons corresponding to the one or more candidate regions. Further, the processing engine 112 may join the one or more polygons in the road network map and identify the one or more candidate links associated with one or more candidate regions based on a joining result. More descriptions regarding the identification of the one or more candidate links may be found elsewhere in the present disclosure, for example, FIG. 6 and the description thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 6:
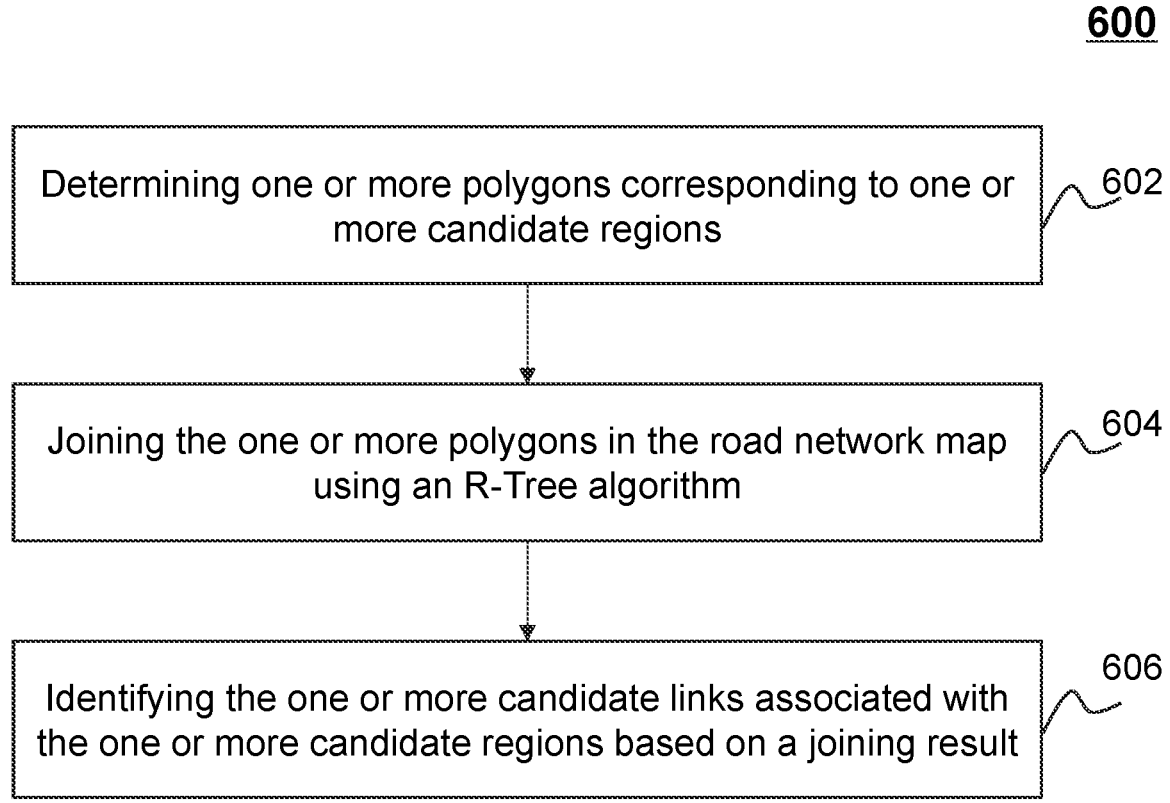
FIG. 6 is a flowchart illustrating an exemplary process for identifying one or more candidate links according to some embodiments of the present disclosure.

FIG. 6 is a flowchart illustrating an exemplary process for identifying one or more candidate links according to some embodiments of the present disclosure. The process 600 may be executed by the road identification system 100. For example, the process 600 may be implemented as a set of instructions (e.g., an application) stored in the storage ROM 230 or RAM 240. The processor 220 and/or the modules in FIG. 3 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting. In some embodiments, operation 408 may be performed based on process 600.

In 602, the processing engine 112 (e.g., the candidate link identification module 340) (e.g., the processing circuits of the processor 220) may determine one or more polygons corresponding to one or more candidate regions. Take a specific candidate region as an example, as illustrated in FIG. 5-B, a corresponding polygon refers to a geometric object (which may be a vector object) indicating a boundary (i.e., a finally modified boundary based on the level set evolution) of the specific candidate region.

In 604, the processing engine 112 (e.g., the candidate link identification module 340) (e.g., the processing circuits of the processor 220) may join the one or more polygons in the road network map using an R-tree algorithm. As used herein, the road network map may be a grayscale image including one or more lines (which may be vector lines and referred to as "links"), wherein each line represents a road section. In the road network map, each link may be defined by a start point and an end point (both may be represented by geographical coordinates), and also may be labelled with a link ID.

In some embodiments, the processing engine 112 may establish an R-tree index associated with the road network map based on geographical coordinate information. In some embodiments, the processing engine 112 may obtain the R-tree index associated with the road network map from a storage device (e.g., the storage device 150) disclosed elsewhere in the present disclosure. The R-tree index may include a plurality of leaf nodes representing a plurality of regions in the road network map. According to the R-tree index, the processing engine 112 may identify region(s) corresponding to the one or more polygons in the road network map and join the one or more polygons into the road network map.

Figure 7:
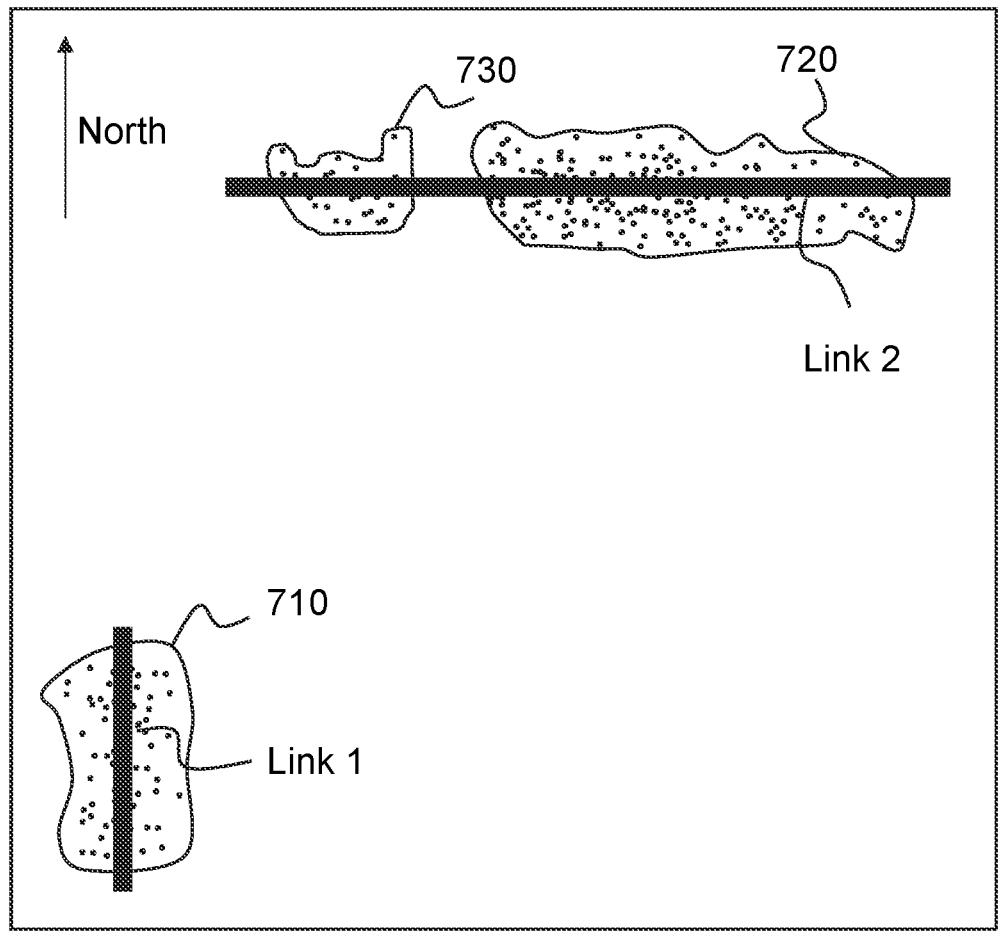
FIG. 7 is a schematic diagram illustrating exemplary polygons and exemplary candidate links according to some embodiments of the present disclosure.

In 606, the processing engine 112 (e.g., the candidate link identification module 340) (e.g., the processing circuits of the processor 220) may identify one or more candidate links associated with the one or more candidate regions based on a joining result. For example, the processing engine 112 may identify link(s) which intersect with the one or more polygons as the candidate link(s). As described in connection with operation 408, each of the one or more candidate links corresponds to at least one of the one or more candidate regions. For example, as illustrated in FIG. 7, link 1 intersects with polygon 710 (which indicates that link 1 corresponds to a candidate region corresponding to polygon 710), whereas, link 2 intersects with polygon 720 and polygon 730 (which indicates that link 2 corresponds to a candidate region corresponding to polygon 720 and a candidate region corresponding to polygon 730).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 8 is a flowchart illustrating an exemplary process for determining a confidence level of a candidate link according to some embodiments of the present disclosure. The process 800 may be executed by the road identification system 100. For example, the process 800 may be implemented as a set of instructions (e.g., an application) stored in the storage ROM 230 or RAM 240. The processor 220 and/or the modules in FIG. 3 may execute the set of instructions, and when executing the instructions, the processor 220 and/or the modules may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting. In some embodiments, operation 410 may be performed based on process 800. For convenience, the description below takes a specific candidate link as an example.

In 802, the processing engine 112 (e.g., the confidence level determination module 350) (e.g., the processing circuits of the processor 220) may obtain flow information of at least one of the one or more candidate regions corresponding to a candidate link. As used herein, the flow information may refer to a number count of tracked vehicles passing through the at least one of the one or more candidate regions over a time period, a number count of driving track points in the at least one of the one or more candidate regions over the time period, or any parameter indicating a density of tracked vehicles in the at least one of the one or more candidate regions over the time period.

In some embodiments, the flow information may include first flow information of the at least one of the one or more candidate regions corresponding to the candidate link over the first time period and second flow information of the at least one of the one or more candidate regions corresponding to the candidate link over the second time period. The processing engine 112 may obtain the first flow information and the second flow information from the first heat map and the second heat map respectively.

In 804, the processing engine 112 (e.g., the confidence level determination module 350) (e.g., the processing circuits of the processor 220) may determine a number count of intersections of the candidate link and at least one polygon corresponding to the at least one of the one or more candidate regions.

In 806, the processing engine 112 (e.g., the confidence level determination module 350) (e.g., the processing circuits of the processor 220) may determine the confidence level of the candidate link based on the flow information and the number count of intersections. For example, the processing engine 112 may determine the confidence level of the candidate link according to equation (1) below:

$$\text{Conf}=\min\{1.0, \exp(-\Delta B/\Delta A)+\max(5,M)*0.05\}, \quad (1)$$

where Conf refers to the confidence level of the candidate link, $\Delta B$ refers to a ratio of a second flow parameter indicating the second flow information to a first flow parameter indicating the first flow information, $\Delta A$ refers to a ratio of the first flow parameter indicating the first flow information to a sum of the first flow parameter indicating the first flow information and the second flow parameter indicating the second flow information, and M refers to the number count of intersections of the candidate link and the at least one polygon corresponding to the at least one of the one or more candidate regions.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 9:
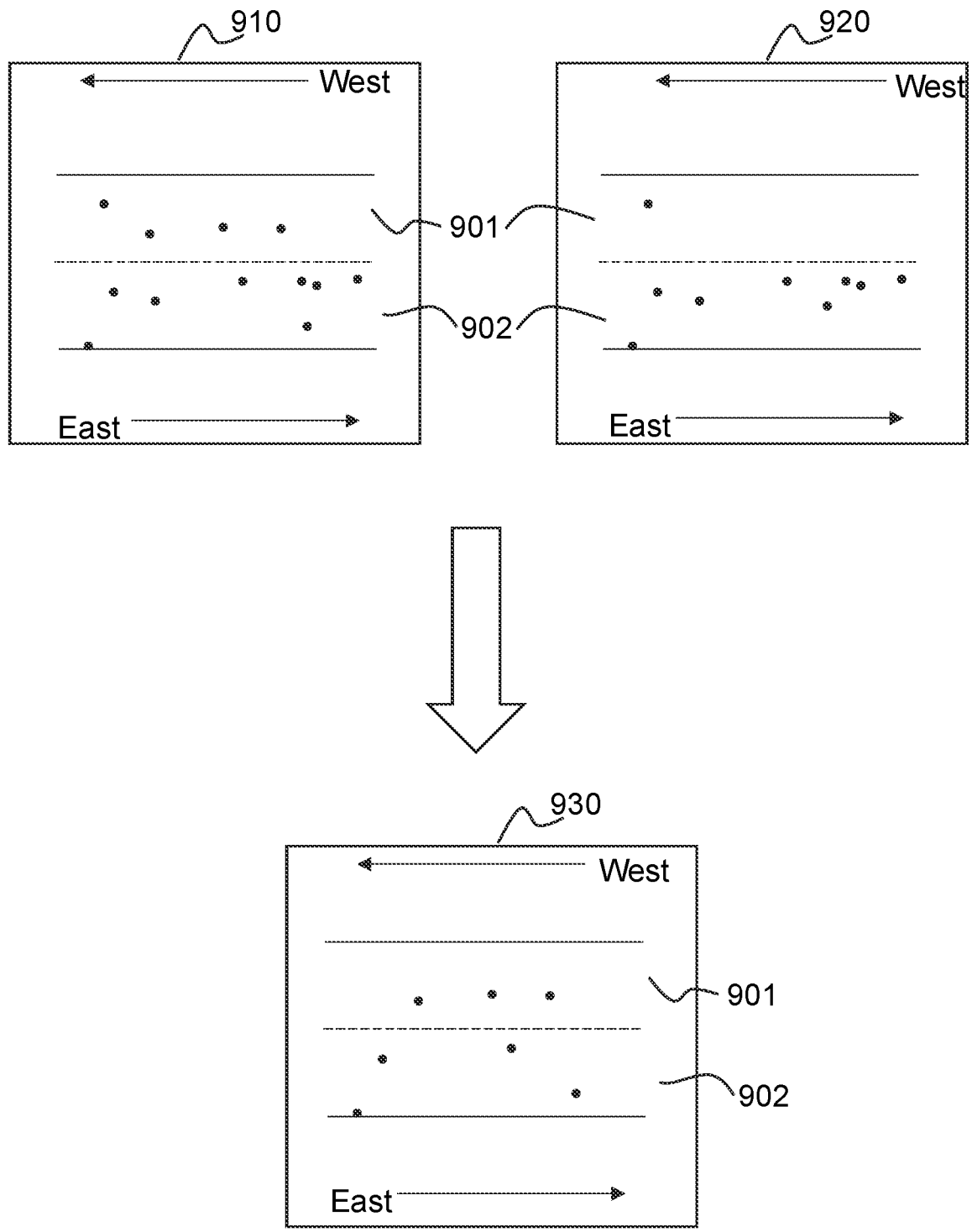
FIG. 9 is a schematic diagram illustrating an exemplary an exemplary process for determining a difference map between the first heat map and the second heat map associated with a target area including at least one low-flow region according to some embodiments of the present disclosure.

FIG. 9 is a schematic diagram illustrating an exemplary process for determining a difference map between the first heat map and the second heat map associated with a target area including at least one low-flow region according to some embodiments of the present disclosure. As used herein, a low-flow region refers to a region with a density of tracked vehicles lower than a flow threshold. The flow threshold may be a default setting of the road identification system 100 or may be adjustable under different situations.

As illustrated, 910 refers to the first heat map, 920 refers to the second heat map, and 930 refers to the difference map. For convenience, only parts of the three maps are shown. It can be seen that both a total amount of driving track points in the first heat map 910 and a total amount of driving track points in the second heat map 920 are relatively low, therefore, even if an amount of driving track points along a lane 901 in the second heat map 920 is actually lower than an amount of driving track points along the lane 901 in the first heat map 910, it is difficult to distinguish an obvious difference between an amount of driving track points along the lane 901 and an amount of driving track points along a lane 902 in the difference map 930. In this situation, the processing engine 112 may determine candidate region(s) based on both the driving track points along the lane 901 and the driving track points along the lane 902, further determine candidate link(s) associated with the candidate region(s), and finally identify closed road section(s) based on the candidate link(s).

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for identifying a closed road section, comprising:
 a storage device to store a set of instructions; and
 a processor, communicatively coupled to the storage device, to execute the set of instructions to:
  obtain a first heat map representing a first density of tracked vehicles in a target area over a first time period and a second heat map representing a second density of tracked vehicles in the target area over a second time period;
  determine a difference map between the first heat map and the second heat map;
  determine a binary map based on the difference map;
  determine one or more candidate regions by performing a level set evolution based on the binary map;
  identify one or more candidate links associated with the one or more candidate regions in a road network map, each of the one or more candidate links linking to at least one of the one or more candidate regions;
  determine one or more confidence levels associated with the one or more candidate links based on the one or more candidate regions; and
  identify one or more closed road sections based on the one or more confidence levels.

2. The system of claim 1, wherein the processor is to determine the first heat map and the second heat map based on a plurality of driving track points associated with a plurality of vehicles in the target area.

3. The system of claim 2, wherein the plurality of driving track points are obtained based on positioning information associated with the plurality of vehicles.

4. The system of claim 1, wherein to obtain the difference map between the first heat map and the second heat map, the processor is to:
 perform a first filtering operation on the first heat map to obtain a first processed heat map and a second filtering operation on the second heat map to obtain a second processed heat map; and
 determine the difference map by subtracting the second processed heat map from the first processed heat map.

5. The system of claim 1, wherein to identify the one or more candidate links associated with the one or more candidate regions in the road network map, the processor is to:
 determine one or more polygons corresponding to the one or more candidate regions;
 join the one or more polygons in the road network map using an R-Tree algorithm; and
 identify the one or more candidate links associated with the one or more candidate regions based on a joining result.

6. The system of claim 1, wherein to determine the one or more confidence levels associated with the one or more candidate links based on the one or more candidate regions, the processor is to:
 for each of the one or more candidate links;
  obtain flow information of the at least one of the one or more candidate regions corresponding to the candidate link;
  determine a number count of intersections of the candidate link and at least one polygon corresponding to the at least one of the one or more candidate regions; and
  determine the confidence level of the candidate link based on the flow information and the number count of intersections.

7. The system of claim 1, wherein to identify the one or more closed road sections based on the one or more confidence levels, the processor is to:
 select, based on the one or more confidence levels, one or more target links from the one or more candidate links, a link corresponding to a road section, wherein the confidence level indicates a probability that a candidate link corresponds to a closed road section; and
 identify the one or more closed road sections based on the one or more target links.

8. The system of claim 7, wherein to select the one or more target links from the one or more candidate links based on the one or more confidence levels, the processor is to:

select candidate links with confidence levels larger than a threshold as the one or more target links.

9. The system of claim 7, wherein to select the one or more target links from the one or more candidate links based on the one or more confidence levels, the processor is to:
rank the one or more candidate links based on the one or more confidence levels; and
select the one or more target links from the one or more candidate links based on a ranking result.

10. A method for identifying a closed road section, implemented on a computing device having at least one processor, at least one storage medium, and a communication platform connected to a network, the method comprising:
obtaining a first heat map representing a first density of tracked vehicles in a target area over a first time period and a second heat map representing a second density of tracked vehicles in the target area over a second time period;
determining a difference map between the first heat map and the second heat map;
determining a binary map based on the difference map;
determining one or more candidate regions by performing a level set evolution based on the binary map;
identifying one or more candidate links associated with the one or more candidate regions in a road network map, each of the one or more candidate links linking to at least one of the one or more candidate regions;
determining one or more confidence levels associated with the one or more candidate links based on the one or more candidate regions; and
identifying one or more closed road sections based on the one or more confidence levels.

11. The method of claim 10, wherein the first heat map and the second heat map are determined based on a plurality of driving track points associated with a plurality of vehicles in the target area.

12. The method of claim 11, wherein the plurality of driving track points are obtained based on positioning information associated with the plurality of vehicles.

13. The method of claim 10, wherein the obtaining a first heat map representing a first density of tracked vehicles in a target area over a first time period and a second heat map representing a second density of tracked vehicles in the target area over a second time period includes:
performing a first filtering operation on the first heat map to obtain a first processed heat map and a second filtering operation on the second heat map to obtain a second processed heat map; and
determining the difference map by subtracting the second processed heat map from the first processed heat map.

14. The method of claim 10, wherein the identifying one or more candidate links associated with the one or more candidate regions in a road network map includes:
determining one or more polygons corresponding to the one or more candidate regions;
joining the one or more polygons in the road network map using an R-Tree algorithm; and
identifying the one or more candidate links associated with the one or more candidate regions based on a joining result.

15. The method of claim 10, wherein the determining one or more confidence levels associated with the one or more candidate links based on the one or more candidate regions includes:
for each of the one or more candidate links,
obtaining flow information of the at least one of the one or more candidate regions corresponding to the candidate link;
determining a number count of intersections of the candidate link and at least one polygon corresponding to the at least one of the one or more candidate regions; and
determining the confidence level of the candidate link based on the flow information and the number count of intersections.

16. The method of claim 10, wherein the identifying one or more closed road sections based on the one or more confidence levels includes:
select, based on the one or more confidence levels, one or more target links from the one or more candidate links, a link corresponding to a road section, wherein the confidence level indicates a probability that a candidate link corresponds to a closed road section; and
identify the one or more closed road sections based on the one or more target links.

17. The method of claim 16, wherein the selecting, based on the one or more confidence levels, one or more target links from the one or more candidate links includes:
selecting candidate links with confidence levels larger than a threshold as the one or more target links.

18. A non-transitory computer readable medium, comprising a set of instructions for identifying a closed road section, wherein when executed by at least one processor, the set of instructions direct the at least one processor to effectuate a method, the method comprising:
obtaining a first heat map representing a first density of tracked vehicles in a target area over a first time period and a second heat map representing a second density of tracked vehicles in the target area over a second time period;
determining a difference map between the first heat map and the second heat map;
determining a binary map based on the difference map;
determining one or more candidate regions by performing a level set evolution based on the binary map;
identifying one or more candidate links associated with the one or more candidate regions in a road network map, each of the one or more candidate links linking to at least one of the one or more candidate regions;
determining one or more confidence levels associated with the one or more candidate links based on the one or more candidate regions; and
identifying one or more closed road sections based on the one or more confidence levels.

* * * * *